United States Patent
Akiyama

(10) Patent No.: US 10,182,486 B2
(45) Date of Patent: Jan. 15, 2019

(54) LED DRIVE CIRCUIT

(71) Applicants: CITIZEN WATCH CO., LTD., Nishitokyo-shi (JP); CITIZEN ELECTRONICS CO., LTD., Fujiyoshida-shi, Yamanashi (JP)

(72) Inventor: Takashi Akiyama, Sayama (JP)

(73) Assignees: Citizen Watch Co., Ltd., Tokyo (JP); Citizen Electronics Co., Ltd., Fujiyoshida-shi, Yamanashi (JP)

( * ) Notice: Subject to any disclaimer, the term of this patent is extended or adjusted under 35 U.S.C. 154(b) by 0 days.

(21) Appl. No.: 15/509,278

(22) PCT Filed: Sep. 8, 2015

(86) PCT No.: PCT/JP2015/075486
§ 371 (c)(1),
(2) Date: Mar. 7, 2017

(87) PCT Pub. No.: WO2016/039344
PCT Pub. Date: Mar. 17, 2016

(65) Prior Publication Data
US 2017/0280532 A1    Sep. 28, 2017

(30) Foreign Application Priority Data

Sep. 8, 2014  (JP) ................. 2014-182212
Feb. 2, 2015  (JP) ................. 2015-018234

(51) Int. Cl.
*H05B 33/08*     (2006.01)
*H05B 37/02*     (2006.01)
*F21V 23/00*     (2015.01)

(52) U.S. Cl.
CPC ........... *H05B 37/02* (2013.01); *F21V 23/003* (2013.01); *H05B 33/086* (2013.01);
(Continued)

(58) Field of Classification Search
CPC combination set(s) only.
See application file for complete search history.

(56) References Cited

U.S. PATENT DOCUMENTS 7,847,486 B2* 12/2010 Ng .................. H05B 33/0812
                                                          315/119
2010/0013409 A1   1/2010 Quek et al.
(Continued)

FOREIGN PATENT DOCUMENTS

CN     102077373 A    5/2011
CN     102612862 A    7/2012
(Continued)

OTHER PUBLICATIONS

Written Opinion of the International Searching Authority for International Application No. PCT/JP2015/075486, dated Dec. 8, 2015, 8 pages.
(Continued)

*Primary Examiner* — Douglas W Owens
*Assistant Examiner* — Jianzi Chen
(74) *Attorney, Agent, or Firm* — RatnerPrestia

(57) ABSTRACT

Provided is an LED drive circuit whereby the light emission color is easily changed when dimming by adjusting the current that drives the LED. The LED drive circuit has: a variable constant current source; a first LED row having a plurality of LEDs connected in series and emitting light in a first light emission color; a second LED row having a plurality of LEDs connected in series and emitting light in a second light emission color; and a current limiting circuit including a current detection element and a switch element. The LED drive circuit is characterized by: the threshold voltage for the first LED row being larger than the threshold voltage for the second LED row; the first LED row and the second LED row being connected in parallel to the variable constant current source; and the current limiting circuit limiting the current flowing to the second LED row, on the
(Continued)

basis of the current flowing to the current detection element via the first LED row.

11 Claims, 10 Drawing Sheets

(52) U.S. Cl.
CPC ..... *H05B 33/0815* (2013.01); *H05B 33/0824* (2013.01); *H05B 33/0827* (2013.01); *H05B 33/0845* (2013.01); *H05B 33/0857* (2013.01)

(56) References Cited

U.S. PATENT DOCUMENTS

| | | | |
|---|---|---|---|
| 2010/0072902 A1 | 3/2010 | Wendt et al. | |
| 2011/0080432 A1 | 4/2011 | Nakazawa et al. | |
| 2011/0109244 A1 | 5/2011 | Grajcar | |
| 2012/0153833 A1* | 6/2012 | Mikani | H05B 33/0812 315/122 |
| 2013/0063035 A1 | 3/2013 | Baddela et al. | |
| 2013/0187572 A1 | 7/2013 | Grajcar | |
| 2013/0234619 A1 | 9/2013 | Sempel | |
| 2013/0278153 A1 | 10/2013 | Pi | |
| 2013/0328491 A1* | 12/2013 | Chou | H05B 37/02 315/191 |
| 2014/0232277 A1 | 8/2014 | Takahashi et al. | |
| 2014/0361711 A1 | 12/2014 | Takahashi | |

FOREIGN PATENT DOCUMENTS

| | | |
|---|---|---|
| JP | 2010506395 A | 2/2010 |
| JP | 2011528488 A | 11/2011 |
| JP | 2014502411 A | 1/2014 |
| JP | 2014157744 A | 8/2014 |
| WO | 2013118208 A1 | 5/2015 |

OTHER PUBLICATIONS

International Search Report and Written Opinion for International Application No. PCT/JP2015/075486, dated Dec. 8, 2015, 7 Pages.

Extended European Search Report for European Application No. 15839840.4, dated Mar. 12, 2018, 9 pages.

Chinese Office Action for Chinese Application No. 201580048063.7, dated Aug. 28, 2018 with translation, 22 pages.

* cited by examiner

LED DRIVE CIRCUIT

CROSS REFERENCE TO RELATED APPLICATIONS

This is the U.S. National Phase application of PCT International Application No. PCT/JP2015/075486, filed Sep. 8, 2015, and claims priority to Japanese Patent Application No. 2014-182212, filed Sep. 8, 2014, and Japanese Patent Application No. 2015-018234, filed Feb. 2, 2015, the disclosures of each of these applications being incorporated herein by reference in their entireties for all purposes.

FIELD OF THE INVENTION

The present invention relates to a dimmable LED drive circuit, and more particularly to an LED drive circuit for controlling the light output by adjusting a current to be supplied to an LED.

BACKGROUND OF THE INVENTION

It has long been known to connect a dimmer between an AC utility power source and an incandescent lamp to control the light output of the incandescent lamp. The dimmer contains a TRIAC, and controls the RMS value in such a manner as to truncate a portion of the AC waveform of the AC utility power. In recent years, LED lamps using LEDs as light sources have been replacing incandescent lamps, and LED lamps that can be used with dimmers are also available in the market.

Patent document 1 discloses an LED lamp which detects an applied voltage waveform (phase switching), obtains a dimming factor from the detection result, and generates a current to be supplied to an LED based on the dimming factor. Patent document 1 describes that the LED is driven by a current controlled by pulse-width modulation (PWM) or constant current control. In particular, when driving the LED with a current controlled by constant current control, the advantage is that the LED is essentially unaffected by variations in utility power supply voltage, and does not produce perceivable flicker.

PATENT DOCUMENT

Patent document 1: Tokuhyou (Published Japanese Translation of PCT application) No. 2011-528488 (paragraphs 0017 to 0020)

SUMMARY OF THE INVENTION

An incandescent lamp controlled by a dimmer, when set to a high brightness level, emits light with a high color temperature that gives an active impression and, when set to a low brightness level, emits light with a low color temperature that gives a relaxed impression. On the other hand, with the LED drive circuit (LED lamp) disclosed in patent document 1, stable dimming can be achieved, but changing the color of emitted light, as in an incandescent lamp, cannot be easily achieved.

It is an object of the present invention to provide an LED drive circuit that can easily change the color of emitted light when controlling the light output by adjusting an LED drive current.

An LED drive circuit includes a variable constant current source, a first LED string having a plurality of series-connected LEDs and configured to emit a first color of light, a second LED string having a plurality of series-connected LEDs and configured to emit a second color of light, and a current limiting circuit containing a current sensing element and a switching element, wherein the first LED string has a larger threshold voltage than the second LED string, the first LED string and the second LED string are connected in parallel with each other to the variable constant current source, and the current limiting circuit limits a current flowing through the second LED string, based on a current flowing into the current sensing element via the first LED string.

Preferably, the LED drive circuit further includes a third LED string disposed between the variable constant current source and the first and second LED strings.

Preferably, the LED drive circuit further includes a third LED string which is connected in parallel with the first and second LED strings to the variable constant current source, and an additional current limiting circuit containing a second current sensing element and a second switching element, and wherein the additional current limiting circuit limits a current flowing through the third LED string, based on a current flowing into the second current sensing element.

Preferably, the LED drive circuit further includes a third LED string, wherein an anode of the third LED string is connected to a terminal at which a current from the variable constant current source 15 is output, and a cathode of the third LED string is connected to a terminal through which the current output from the variable constant current source 15 is fed back.

Preferably, the LED drive circuit further includes an output resistor which is connected between the current sensing element and a current output terminal of the switching element.

Preferably, in the LED drive circuit, the switching element is a depletion-mode FET.

Preferably, in the LED drive circuit, the current limiting circuit contains a bipolar transistor, the current sensing element is connected between a base and emitter of the bipolar transistor, and the switching element is controlled by a voltage output from a collector of the bipolar transistor.

Preferably, in the LED drive circuit, the switching element is an enhancement-mode FET.

Preferably, in the LED drive circuit, the current sensing element includes a thermistor.

Preferably, in the LED drive circuit, the emission color of the second LED string, plotted as chromaticity coordinates in a CIE color system, is located between the emission color of the first LED string plotted as chromaticity coordinates and the emission color of the third LED string plotted as chromaticity coordinates, and a broken line connecting the chromaticity coordinates of the respective emission colors substantially follows a black body locus.

More specifically, the present invention provides an LED drive circuit includes a variable constant current source capable of varying an output current value by being controlled externally, a first LED string constructed from a plurality of series-connected LEDs and configured to emit a first color of light, a second LED string constructed from a plurality of series-connected LEDs and configured to emit a second color of light, and a current limiting circuit containing a current sensing element and a switching element, and wherein the first LED string has a larger threshold voltage than the second LED string, and the first LED string and the second LED string are connected in parallel with each other to the variable constant current source, wherein a current output from the first LED string flows into the current sensing element, while a current output from the second LED string flows into the switching element, and the current flowing through the first LED string limits the current flowing through the second LED string.

The variable constant current source contained in the above LED drive circuit varies the value of the current to be output, based on a signal obtained from an external device such as a dimmer, and supplies the current to the first and second LED strings. When the value of the current output from the variable constant current source lies in a small current region, the current flows only through the second LED string having the smaller threshold voltage. At this time, the voltage at the current output terminal of the variable constant current source is higher than the threshold voltage of the second LED string but lower than the threshold voltage of the first LED string. When the value of the current output from the variable constant current source lies in a current region such that the output current value slightly exceeds the upper limit value of the current limiting circuit, the voltage at the current output terminal of the variable constant current source rises and exceeds the threshold voltage of the first LED string. Thereupon, the current begins to flow through the first LED string and, because of this current, the voltage drop across the current sensing element increases and the switching element contained in the current limiting circuit acts so as to reduce the current flowing through the second LED string. When the current output from the variable constant current source further increases and the current value lies in a large current region, the current flowing through the first LED string causes the switching element contained in the current limiting circuit to cut off and thus reduces the current flowing through the second LED string to zero. As a result, the current flows only through the first LED string. The LED drive circuit for controlling the light output by controlling the current value as described above emits light with the second color when the value of the output current of the variable constant current source is small, emits light with the second color mixed with the first color when the current value is at an intermediate level, and emits light with only the first color when the current value is further increased.

In the LED drive circuit, the current region where only the first LED string is driven to emit light, the current region where the first LED string and the second LED string are both driven to emit light, and the current region where only the second LED string is driven to emit light appear according to the output current of the variable constant current source, and the color of the emitted light can be easily changed when controlling the light output.

DETAILED DESCRIPTION OF EMBODIMENTS OF THE INVENTION

LED drive circuits according to the present invention will be described below with reference to the drawings. It will, however, be noted that the technical scope of the present invention is not limited by any particular embodiment described herein, but extends to the inventions described in the appended claims and their equivalents.

Figure 1:
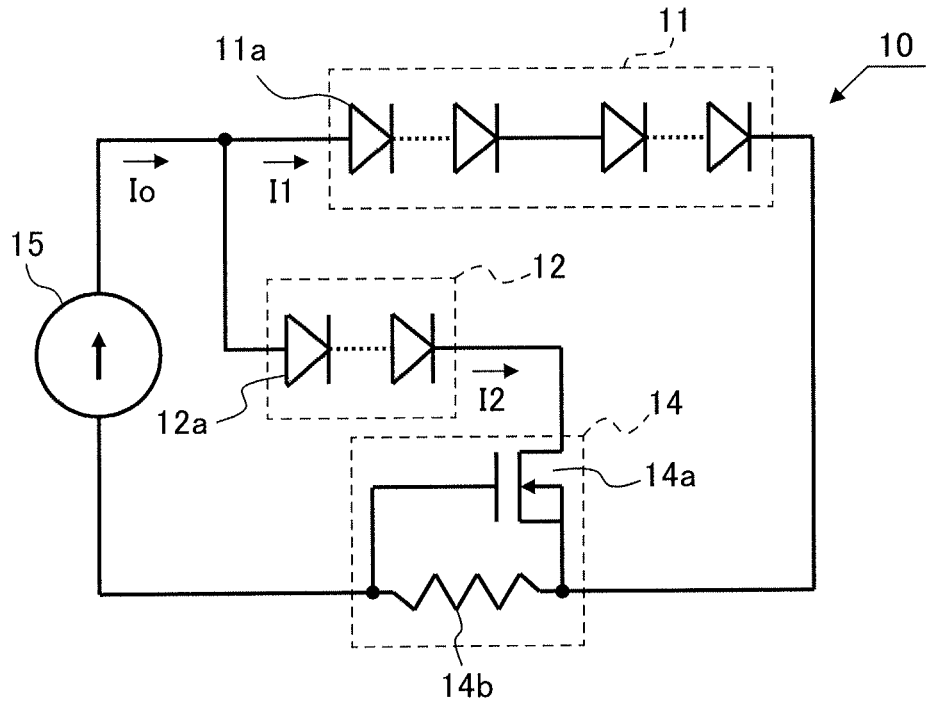
FIG. 1 is a circuit diagram of an LED drive circuit 10.

FIG. 1 is a circuit diagram of an LED drive circuit 10.

As shown in FIG. 1, the LED drive circuit 10 includes a variable constant current source 15, a first LED string 11, a second LED string 12, and a current limiting circuit 15.

The variable constant current source 15 is configured to be capable of varying the value of its output current in accordance with an externally supplied control signal (not shown), and outputs the current in the direction shown by an arrow in the figure.

The first LED string 11 is constructed from a plurality of series-connected LEDs 11a, and emits a first color of light. The second LED string 12 is constructed from a plurality of series-connected LEDs 12a, and emits a second color of light. The anodes of the LEDs 11a and 12a are connected to a terminal (current output terminal) at which the current of the variable constant current source 15 is output.

The current limiting circuit 14 includes a current sensing resistor 14b as a current sensing element, and a depletion-mode FET 14a as a switching element. The drain of the FET 14a is connected to the cathode of the second LED string 12, and the source is connected to the right terminal of the current sensing resistor 14b as well as to the cathode of the first LED string 11, while the gate is connected to the left terminal of the current sensing resistor 14b which is a terminal to which the output current output from the variable constant current source 15 returns.

The number of series-connected LEDs 11a contained in the first LED string 11 is larger than the number of series-connected LEDs 12a contained in the second LED string 12. That is, the threshold voltage of the first LED string 11 is larger than the threshold voltage of the second LED string 12. The forward voltage drop of the LED 11a is equal to that of the LED 12a. The threshold voltage is given as the product of the forward voltage drop and the number of series-connected LEDs. The first color of light refers to the color of light whose color temperature is, for example, about 2700 K. The LED 11a can be produced by coating a blue-emitting LED die with a yellow phosphor. The second color of light refers to the color of light whose color temperature is, for example, about 1600 K. The LED 12a can be produced by combining a blue-emitting LED die with a phosphor having an emission color between orange and red.

Alternatively, the second LED string 12 may originally be constructed from LEDs that emit light of low color temperatures such as red or orange. If the forward voltage drop is different between the LED 11*a* and the LED 12*a*, the number of series-connected LEDs in the first LED string 11 and the number of series-connected LEDs in the second LED string 12 are chosen so that the threshold voltage of the second LED string 12 given as the product of the forward voltage drop and the number of series-connected LEDs 12*a* is smaller than the threshold voltage of the first LED string 11.

In the LED drive circuit 10, the current Io output from the variable constant current source 15 flows into the first LED string 11 and the second LED string 12. The current I1 passed through the first LED string 11 flows into the current sensing resistor 14*b*, and the current I2 passed through the second LED string 12 flows into the current sensing resistor 14*b* via the drain and source of the FET 14*a*.

Figure 2:
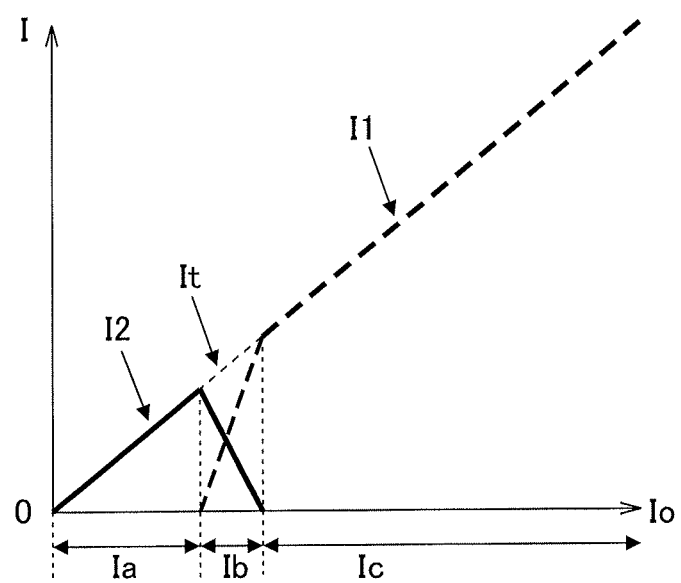
FIG. 2 is a diagram for explaining the operation of the LED drive circuit 10 shown in FIG. 1.

FIG. 2 is a diagram for explaining the operation of the LED drive circuit 10, where the abscissa represents the output current Io of the variable constant current source 15 and the ordinate represents the current I flowing through the various parts.

The operation of the LED drive circuit 10 will be described below with reference to FIG. 2. The current It flowing through the entire LED drive circuit 10 is the sum of the current I1 flowing through the first LED string 11 and the current I2 flowing through the second LED string 12. The current It is equal to the output current Io of the variable constant current source 15, and is represented by a straight line having a slope of 45° in FIG. 2.

When the output current Io of the variable constant current source 15 is small, that is, when the brightness level is decreased, only the current I2 to the second LED string 12 flows (It=I2, I1=0, the current range indicated by Ia). In this case, the voltage at the current output terminal of the variable constant current source 15 (relative to the voltage at the current return terminal which is assumed to be 0 V; the same applies hereinafter) is larger than the threshold voltage of the second LED string 12 but smaller than the threshold voltage of the first LED string 11.

The threshold voltage of the LED string here is given as the sum of the forward voltage drops of the series-connected LEDs contained in the LED string. For example, if the LED series circuit contains a total of 10 LEDs each having a forward voltage drop of 3.2 V, the threshold voltage is given as 3.2 (V)×10=32 (V). In the LED drive circuit 10, if the variation range of the voltage that can stably drive the output terminal of the variable constant current source 15 at a constant current is small, the difference between the number of series-connected LEDs in the first LED string 11 and the number of series-connected LEDs in the second LED string 12 should be held to about two or three to reduce the difference between their threshold voltages.

The current limiting circuit 14 sets an upper limit value on the current I2 (as indicated at the right end of the current region Ia). When the current I2 is at its upper limit, if the current I2 is increased, the voltage drop across the current sensing resistor 14*b* increases, and the FET 14*a* tries to reduce the current. That is, the current limiting circuit 14 sets the upper limit value on the current I2 by negative feedback. The upper limit value of the current I2 is determined by the resistance value of the current sensing resistor 14*b* and the characteristics of the PET 14*a*.

When the output current Io of the variable constant current source 15 exceeds the upper limit value of the current limiting circuit 14, a current equal to the amount by which the current Io exceeds the upper limit value of the current limiting circuit 14 begins to flow through the first LED string 11. Due to this current I1, the voltage drop across the current sensing resistor 14*b* increases, and the current I2 flowing through the FET 14*a* decreases. As the current I2 deceases, the current I1 increases correspondingly, but since the rate of decrease of the current I2 is slower than the rate of increase of the current I1, an operating point at which the current I1 and the current I2 flow simultaneously (the voltage at the output terminal of the variable constant current source 15) is determined (It=I1+I2).

When the output current Io of the variable constant current source 15 further increases (the current range indicated by Ic), the current flowing through the second LED string 12 decreases to 0 (A) (It=I1).

When the output current Io of the variable constant current source 15 lies within the current range Ia, only the second LED string 12 is driven which thus emits light with the second color, and the brightness of the light from the second LED string 12 changes as the current Io changes. When the current Io lies within the current range Ib, the first LED string 11 and the second LED string 12 are simultaneously driven to emit light, and the brightness of the light from each of the first and second LED strings 11 and 12 changes as the current Io changes. Furthermore, since the relative proportions of the brightness of the light of the first color from the first LED string 11 and the brightness of the light of the second color from the second LED string 12 change as the current Io changes, the color of the light emitted from the LED drive circuit changes. When the output current Io lies within the current range Ic, only the first LED string 11 is driven which thus emits light with the first color, and the brightness of the light from the first LED string 11 changes as the current Io changes.

Assume that the color temperature of the light (the first color) emitted by the first LED string 11 is 2700 K and that the color temperature of the light (the second color) emitted by the second LED string 12 is 1600 K; then, at low brightness levels (in the current range Ia), the LED drive circuit 10 emits light rich in red. On the other hand, at high brightness levels (in the current range Ic), the LED drive circuit 10 emits white light with reduced redness. At intermediate brightness levels (in the current range Ib), the light emitted from the first LED string 11 and the light emitted from the second LED string 12 are mixed together, and the LED drive circuit 10 emits light with an intermediate color temperature, with the redness decreasing as the brightness level increases.

While the first LED string 11 for producing the first emission color has been described as being constructed by combining blue-emitting LED dies with yellow phosphors, the combination for producing the first emission color is not limited to this particular combination. For example, the desired color temperature may be achieved by suitably combining, for example, a red-emitting LED die, a green-emitting LED die, and a blue-emitting LED die. The only requirement is that the first LED string 11 be constructed to produce the first emission color as a whole. Similarly, the second LED string 12 need only be constructed to produce the second emission color.

While the LED drive circuit 10 has been described as using the current sensing resistor 14*b* as the current sensing element, the current sensing element used in the LED drive circuit 10 need not be limited to a resistor. Any element that can control the switching element by detecting the current can be used as the current sensing element; for example, a transistor or a current sensor IC may be used.

It has also been described by way of example that the signal for controlling the variable constant current source 15 contained in the LED drive circuit is created by processing the output voltage waveform of a dimmer. However, the control signal need not necessarily be limited to the signal created based on the output voltage waveform of the dimmer, but a digital control signal transmitted, for example, from a remote controller or via a power supply line may be used instead.

Figure 3:
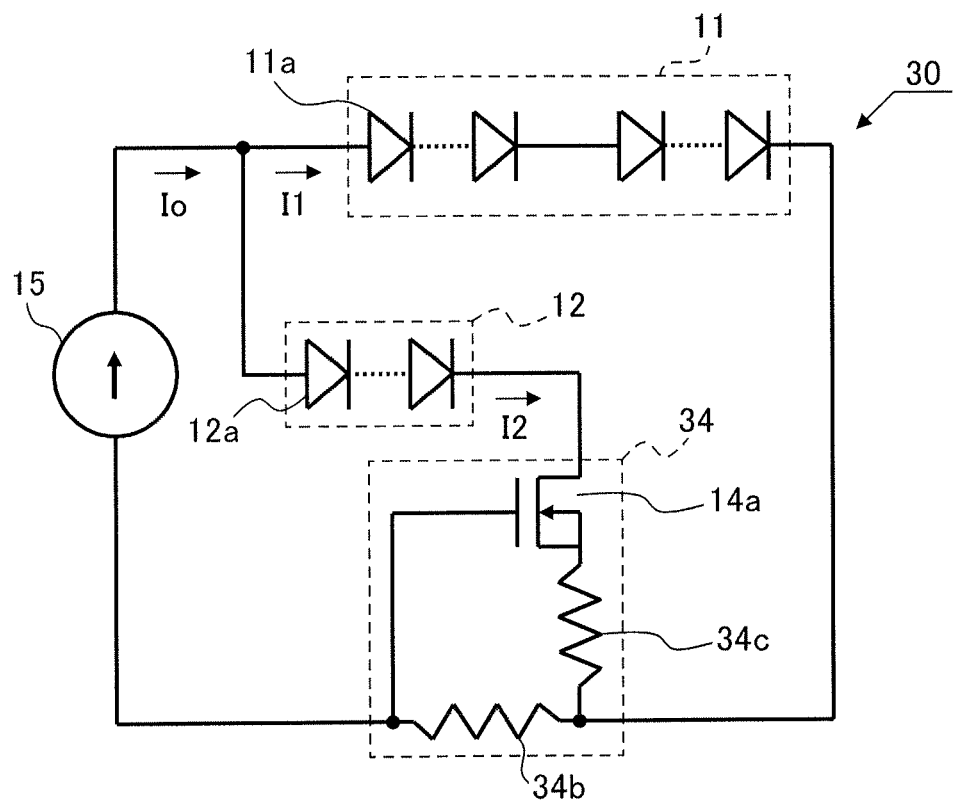
FIG. 3 is a circuit diagram of an alternative LED drive circuit 30.

FIG. 3 is a circuit diagram of an alternative LED drive circuit 30.

The LED drive circuit 30 differs from the LED drive circuit 10 only in that the current sensing resistor 14b used in the LED drive circuit 10 is replaced by a current sensing resistor 34b (current sensing element) and a source resistor 34c (output resistor) both contained in the current limiting circuit 34. Here, the cathode of the first LED string 11 is connected to the right terminal of the current sensing resistor 34b.

Figure 4:
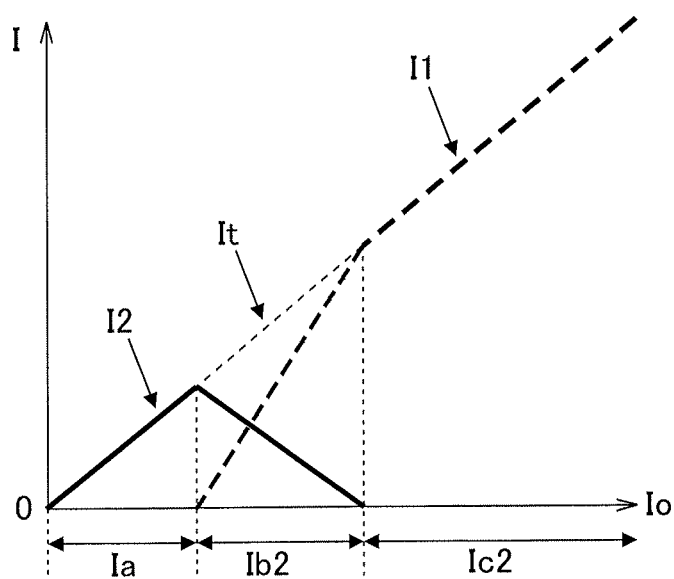
FIG. 4 is a diagram for explaining the operation of the LED drive circuit 30 shown in FIG. 3.

FIG. 4 is a diagram for explaining the operation of the LED drive circuit 30, where the abscissa represents the output current Io of the variable constant current source 15 and the ordinate represents the current I flowing through the various parts.

The operation of the LED drive circuit 30 will be described below with reference to FIG. 4. The current It flowing through the entire LED drive circuit 30 is the sum of the current I1 flowing through the first LED string 11 and the current I2 flowing through the second LED string 12. The current It is equal to the output current Io of the variable constant current source 15, and is represented by a straight line having a slope of 45° in FIG. 4.

The difference between FIG. 4 and FIG. 2 is that the intermediate current region Ib2 shown in FIG. 4 is wider than the current region Ib shown in FIG. 2. As a result, in the current region Ib2, the current I2 flowing through the second LED string 12 decreases more gradually than in FIG. 2, and similarly, the current I1 flowing through the first LED string 11 increases more gradually. This is because, when the voltage drop across a composite resistor formed by combining the source resistor 34c with the current sensing resistor 34b is fed back to the FET 14a, the proportion of the current I1 flowing through the first LED string 11 that can contribute to the feedback is reduced compared with the case of FIG. 2. The current sensing resistor 34b constitutes a part of the composite resistor, and the value of the current sensing resistor 34b is chosen to be smaller than the value of the current sensing resistor 14b. For example, the values may be chosen so that the relation R14b=R34b+R34c holds. R14b is the resistance value of the current sensing resistor 14b, R34b is the resistance value of the current sensing resistor 34b, and R34c is the resistance value of the source resistor 34c.

As a result, the intermediate current range Ib2 in the LED drive circuit 30 becomes wider than the corresponding current range in the LED drive circuit 10, and the change from the first color to the second color in the color of emission becomes smoother. Further, the position and width of the intermediate current region can be changed by adjusting the resistance values R14b, R34b, and R34c.

Figure 5:
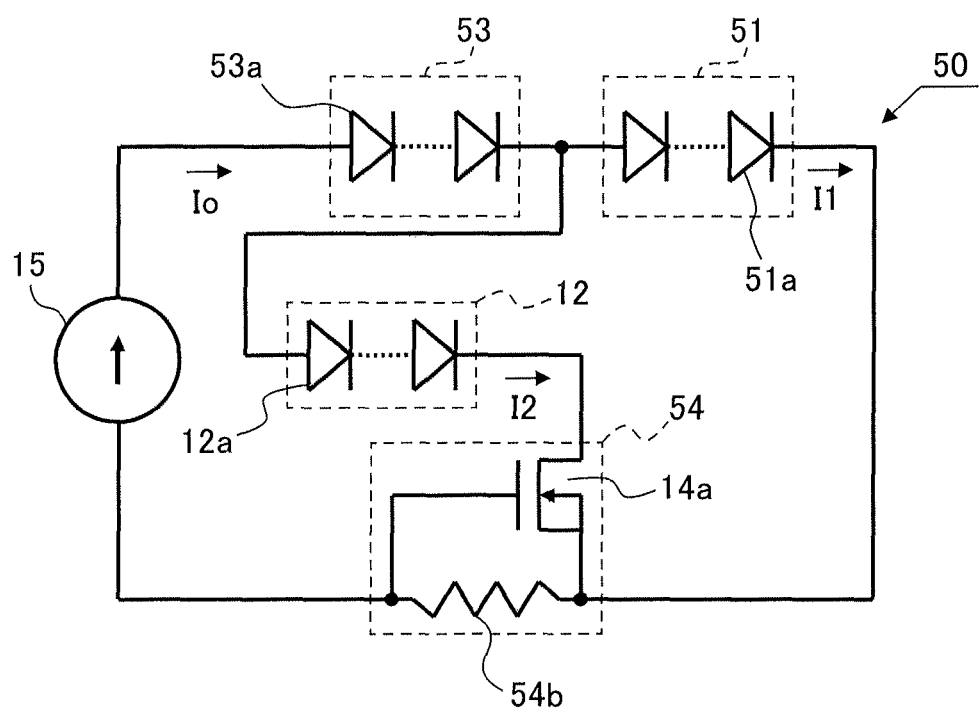
FIG. 5 is a circuit diagram of another alternative LED drive circuit 50.

FIG. 5 is a circuit diagram of another alternative LED drive circuit 50.

The LED drive circuit 50 differs from the LED drive circuit 10 only in that the first LED string 11 in the LED drive circuit 10 is divided into a first LED string 51 and a third LED string 53, and the anode of the first LED string 51 and the anode of the second LED string 12 are connected to the cathode of the third LED string 53.

The number of series-connected LED 51a contained in the first LED string 51 (the threshold voltage of the first LED string 51) is chosen to be larger than the number of series-connected LED 12a contained in the second LED string 12 (the threshold voltage of the second LED string 12). In the current limiting circuit 54, the current sensing resistor 54b as the current sensing element is often adjusted to a value different from that of the current sensing resistor 14b shown in FIG. 1.

The LED drive circuit 50 is designed so that when the variable constant current source 15 is supplying a large current Io, the second LED string 12 is turned off and the first LED string 51 and the third LED string 53 are both driven to emit light. That is, when the variable constant current source 15 is supplying a large current Io, the LED drive circuit 50 operates in the same manner as the LED drive circuit 10 of FIG. 1 operating in the current region Ic (see FIG. 2). At this time (when the dimmer is set to a high brightness level), the color of the light emitted from the LED drive circuit 50 is the same as that of the LED drive circuit 10.

On the other hand, when the variable constant current source 15 is supplying an intermediate current Io (which corresponds to the current region Ib shown in FIG. 2), or when the variable constant current source 15 is supplying a small current Io (which corresponds to the current region Ia shown in FIG. 2), since the third LED string 53 is driven to emit light, the color of the light emitted from the LED drive circuit 50 is different from that of the LED drive circuit 10.

Figure 6:
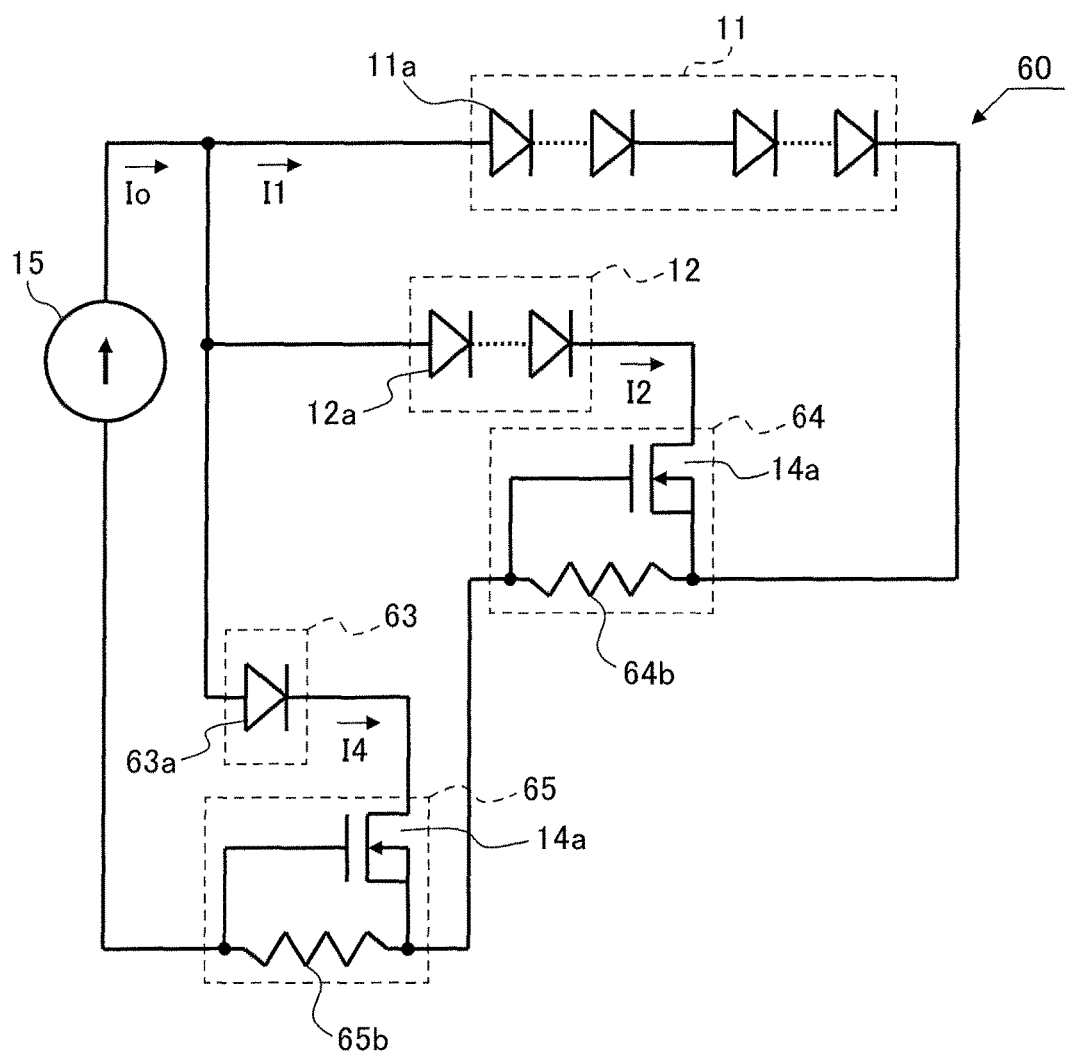
FIG. 6 is a circuit diagram of still another alternative LED drive circuit 60.

FIG. 6 is a circuit diagram of still another alternative LED drive circuit 60.

The LED drive circuit 60 differs from the LED drive circuit 10 in that the LED drive circuit 60 further includes a fourth LED string 63, which is connected in parallel with the first LED string 11 and the second LED string 12, and an additional current limiting circuit 65. In the LED drive circuit 60, the number of parallel-connected LED strings is increased by adding the fourth LED string 63 and the current limiting circuit 65.

In the LED drive circuit 60, the number of series-connected LEDs 11a contained in the first LED string 11 (the threshold voltage of the first LED string 11), the number of series-connected LEDs 12a contained in the second LED string 12 (the threshold voltage of the second LED string 12), and the number of series-connected LEDs 63a contained in the fourth LED string 63 (the threshold voltage of the fourth LED string 63) are respectively chosen so that the number of series-connected LEDs (the threshold voltage) decreases in the order named. The value of the current sensing resistor 64b (current sensing element) contained in the current limiting circuit 64 is chosen to be smaller than the value of the current sensing resistor 65b (second current sensing element) contained in the current limiting circuit 65, and the left terminal of the current sensing resistor 64b is connected to the right terminal of the current sensing resistor 65b.

In the LED drive circuit 60, when the variable constant current source 15 is supplying a small current Io, only the fourth LED string 63 is driven to emit light. When the variable constant current source 15 increases the current Io, the fourth LED string 63 turns off, and only the second LED string 12 is driven to emit light. When the variable constant current source 15 further increases the current Io, the second LED string 12 turns off, and only the first LED string 11 is driven to emit light.

As described above, in the LED drive circuit 60, the number of parallel-connected LED strings, two in the LED drive circuit 10, is increased to three by adding the fourth LED string 63 and the current limiting circuit 65. By thus increasing the number of parallel-connected LED strings, the LED drive circuit 60 can increase the degree of freedom with which the color of the emitted light can be changed as the light output is controlled.

Figure 7:
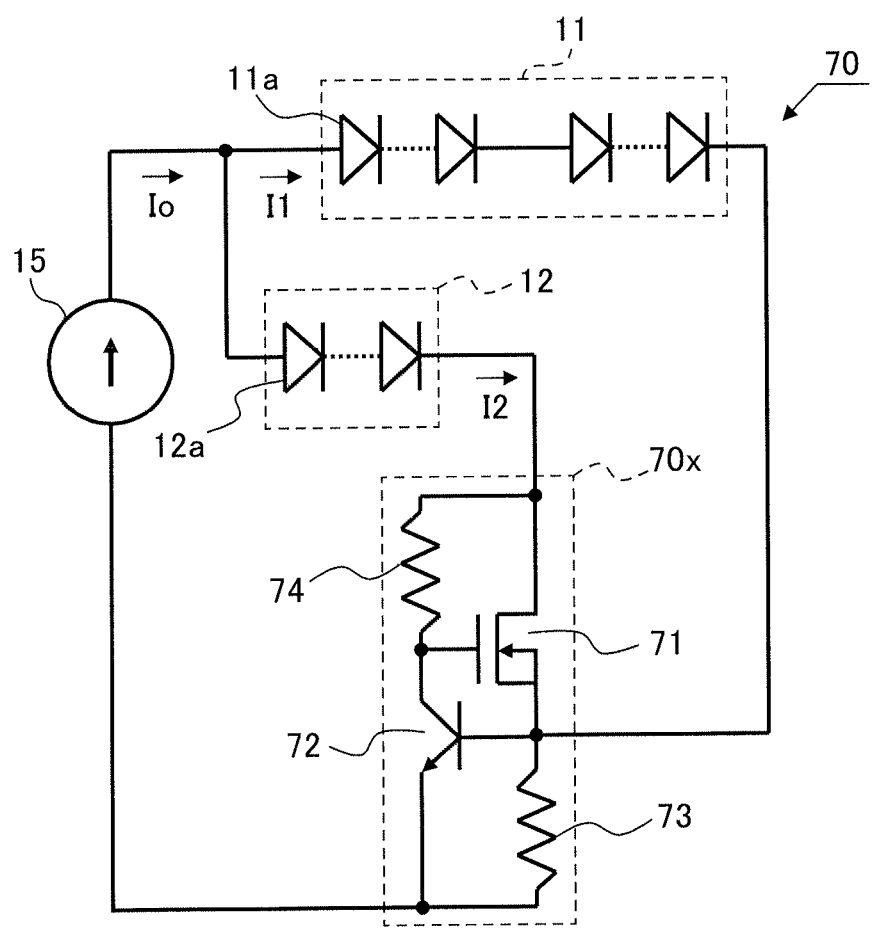
FIG. 7 is a circuit diagram of yet another alternative LED drive circuit 70.

FIG. 7 is a circuit diagram of yet another alternative LED drive circuit 70.

The LED drive circuit 70 differs from the LED drive circuit 10 only in that the current limiting circuit 14 contained in the LED drive circuit 10 is replaced by a current limiting circuit 70x as shown in FIG. 7.

The current limiting circuit 70x includes an enhancement-mode FET 71 as a switching element, a current sensing resistor 73 as a current sensing element, a pull-up resistor 74, and a bipolar transistor 72. The drain of the FET 71 is connected to the top terminal of the pull-up resistor 74 and the cathode of the second LED string 12. The gate of the FET 71 is connected to the bottom terminal of the pull-up resistor 74 and the collector of the transistor 72. The source of the FET 71 is connected to the top terminal of the current sensing resistor 73, the base of the transistor 72, and the cathode of the first LED string 11. The bottom terminal of the current sensing resistor 73 is connected to the emitter of the transistor 72 and the current return terminal of the variable constant current source 15.

The current limiting circuit 70x is a well known circuit as a current limiting circuit or a constant current circuit. When negative feedback is applied to maintain the base-emitter voltage at 0.6 V, the current limiting circuit 70x acts to limit the current I2 flowing through the second LED string 12. Further, when the current I1 flowing through the first LED string 11 increases, and the transistor 72 saturates, the FET 71 cuts off. That is, this circuit operates in a manner similar to the current limiting circuit 14, etc., contained in the LED drive circuit 10, etc.

In each of the LED drive circuits 10, 30, 50, and 60 shown in FIGS. 1, 3, 5, and 6, use has been made of the depletion-mode FET 14a as the switching element in the current limiting circuit 14, 34, 54, 64, or 65. However, in the LED drive circuit, the switching element need not be limited to a depletion-mode FET, but use may be made of an enhancement-mode FET or a bipolar transistor, as shown in FIG. 7.

Figure 8:
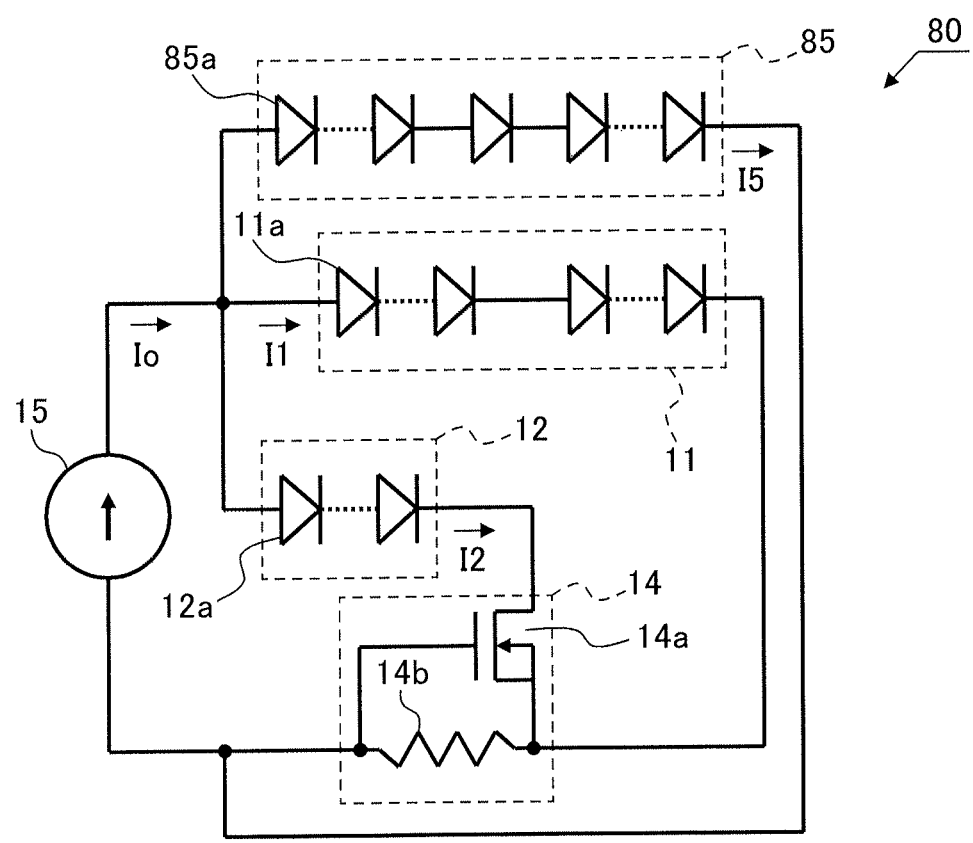
FIG. 8 is a circuit diagram of a further alternative LED drive circuit 80.

FIG. 8 is a circuit diagram of a further alternative LED drive circuit 80.

The LED drive circuit 80 differs from the LED drive circuit 10 only by the inclusion of a fifth LED string 85. The fifth LED string 85 is constructed from a plurality of series-connected LEDs 85a, and its anode is connected to the current output terminal of the variable constant current source 15, while its cathode is connected to the current return terminal of the variable constant current source 15. The fifth LED string 85 emits light with the first color, as in the case of the first LED string 11. The number of series-connected LEDs 85a contained in the fifth LED string 85 is larger only by one than the number of series-connected LEDs 11a contained in the first LED string 11. The LEDs 11a and the LEDs 85a are the same LEDs.

When the FET 14a cuts off, the voltage drop that develops across the current sensing resistor 14b is 3 V, and the forward voltage drop of each LED 85a is chosen to be slightly larger than 3 V. In the current regions Ia and Ib shown in FIG. 2, the LED drive circuit 80 operates in the same manner as the LED drive circuit 10 shown in FIG. 1. That is, in the current region Ia, only the second LED string 12 is driven to emit light, while in the current region Ib, the first LED string 11 and the second LED string 12 are both driven to emit light. In the current regions Ia and Ib, the current flowing through the fifth LED string 85 is 0 (A).

When the output current Io of the variable constant current source 15 is equal to the current that causes the FET 14a to cut off (in FIG. 2, the left end of the current region Ic), the voltage drop that develops across the current sensing resistor 14b is 3 V. Since the threshold voltage of the fifth LED string 85 is a little more than 3 V higher than the threshold voltage of the first LED string 11, the current I1 flows through the first LED string 11 (I1=Io), and no current flows through the fifth LED string 85 (I5=0). When the current Io is increased, and the voltage drop across the current sensing resistor 14b becomes larger than the forward voltage drop of each LED 85a, the current I5 begins to flow through the fifth LED string 85.

In the LED drive circuit 80, power loss is reduced because the current I5 flowing through the fifth LED string 85 does not pass through the current sensing resistor 14b. That is, according to the LED drive circuit 80, lighting equipment can be provided that not only can vary the color of the emitted light when controlling the light output by adjusting the current Io, but can also achieve high brightness and high power utilization when the variable constant current source 15 is supplying a large current Io.

Figure 9:
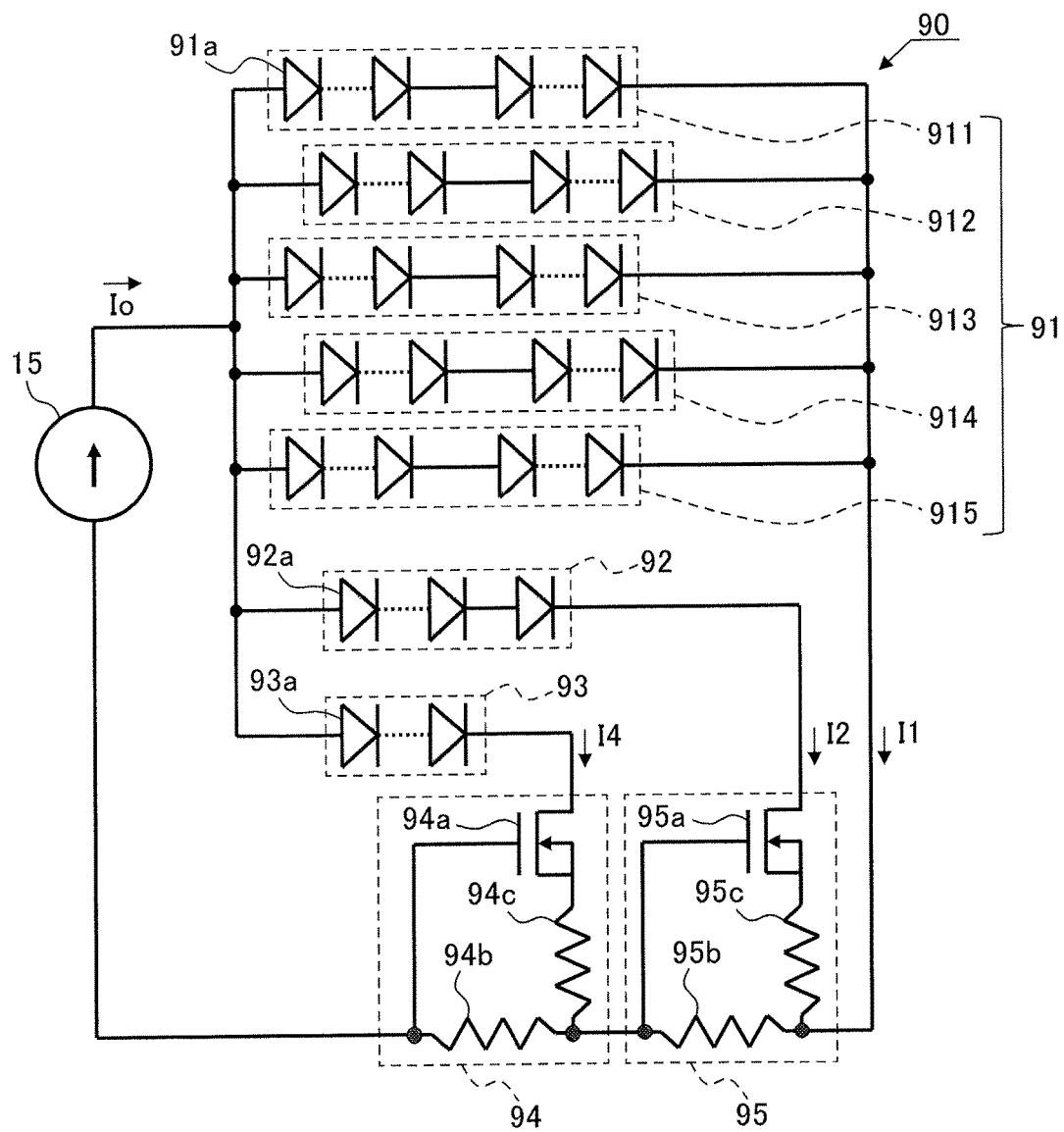
FIG. 9 is a circuit diagram of a still further alternative LED drive circuit 90.

FIG. 9 is a circuit diagram of a still further alternative LED drive circuit 90.

The LED drive circuit 90 is constructed by combining the LED drive circuit 30 shown in FIG. 3 and the LED drive circuit 60 shown in FIG. 6. In the LED drive circuit 90, the first LED string 91, the second LED string 92, the fourth LED string 93, and the current limiting circuits 94 and 95 correspond to the first LED string 11, the second LED string 12, the fourth LED string 63, and the current limiting circuits 64 and 65, respectively, in the LED drive circuit 60. In the LED drive circuit 90, as in the LED drive circuit 30, the current limiting circuits 94 and 95 each comprise an FET 94, 95, a source resistor 94c, 95c (output resistor), and a current sensing resistor 94b, 95b.

The first LED string 91 is constructed from five parallel-connected LED strings 911, 912, 913, 914, and 915, each constructed by connecting 12 LEDs 91a in series. The LED string 91 is equivalent to an LED string constructed from 12 series-connected LED arrays each comprising five parallel-connected LEDs 91a. The reason that the first LED string 91 is constructed in the form of a series-parallel circuit is to prevent the current from concentrating on any particular LEDs 91a and thereby prevent heat dissipation efficiency and light emission efficiency from dropping when causing the LED drive circuit 90 to emit light with high brightness. The second LED string 92 is constructed by connecting nine LEDs 92a in series, and the fourth LED string 93 is constructed by connecting seven LEDs 93a in series. For example, the current sensing resistors 94b and 95b can each be chosen to have a resistance value of several tens of Ohms, and the source resistors 94c and 95c can each be chosen to have a resistance value of several Ohms. The method of interconnecting the various elements in the LED drive circuit 90 is essentially the same as the method of interconnecting the various elements in the respective LED drive circuits 30 and 60.

Figure 10:
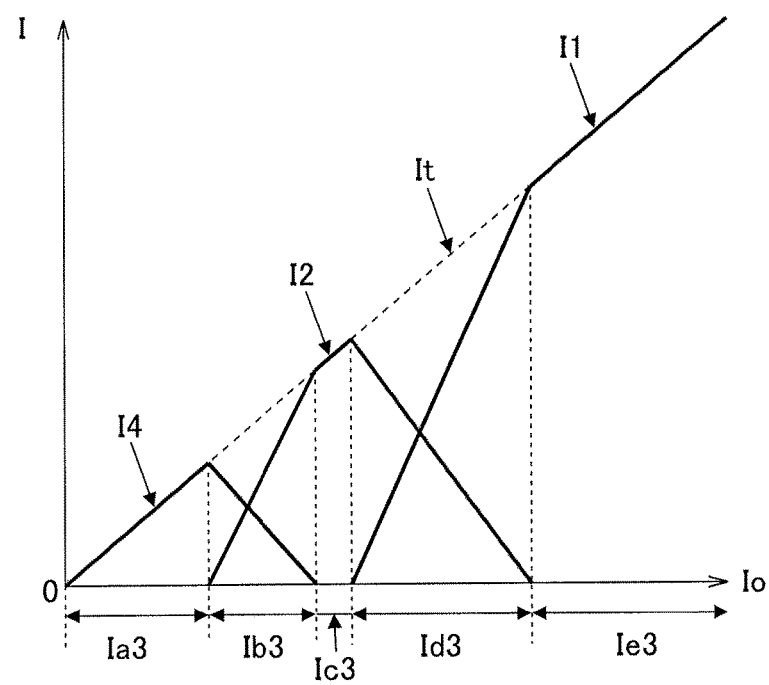
FIG. 10 is a graph for explaining the operation of the LED drive circuit 90 shown in FIG. 9.

FIG. 10 is a graph for explaining the operation of the LED drive circuit 90, where the abscissa represents the output current Io of the variable constant current source 15 and the ordinate represents the current I flowing through the various parts.

The operation of the LED drive circuit 90 will be described below with reference to FIG. 10. The current It flowing through the entire LED drive circuit 90 is the sum of the current I1 flowing through the first LED string 91, the current I2 flowing through the second LED string 92, and the current I4 flowing through the fourth LED string 93. The current It is equal to the output current Io of the variable constant current source 15, and is represented by a straight line having a slope of 45° in FIG. 10.

In the LED drive circuit 90, when the output current Io of the variable constant current source 15 is small, that is, when the brightness level is decreased, only the current I4 to the fourth LED string 93 flows (It=I4, I1=I2=0, the current range indicated by Ia3). When the current Io increases and exceeds the maximum current of the current limiting circuit 94, the current I2 begins to flow through the second LED string 92 (It=I2+I4, I1=0, the current range indicated by Ib3). When the current Io further increases, the FET 94a in the current limiting circuit 94 cuts off (It=I2, I1=I4=0, the current range indicated by Ic3). When the current Io further increases and exceeds the maximum current of the current limiting circuit 95, the current I1 begins to flow through the first LED string 91 (It=I1+I2, I4=0, the current range indicated by Id3). When the current Io further increases, and the FET 95a in the current limiting circuit 95 cuts off, the current flowing as the current It is only the current I1 (It=I1, I2=I4=0, the current range indicated by Ie3).

The operation of the LED drive circuit 90 is basically the same as that of the LED drive circuit 60, but differs in that the period (current range Ib3) during which the second LED string 92 and the fourth LED string 93 are simultaneously driven to emit light and the period (current range Id3) during which the first LED string 91 and the second LED string 92 are simultaneously driven to emit light are longer, as in the LED drive circuit 30.

Figure 11:
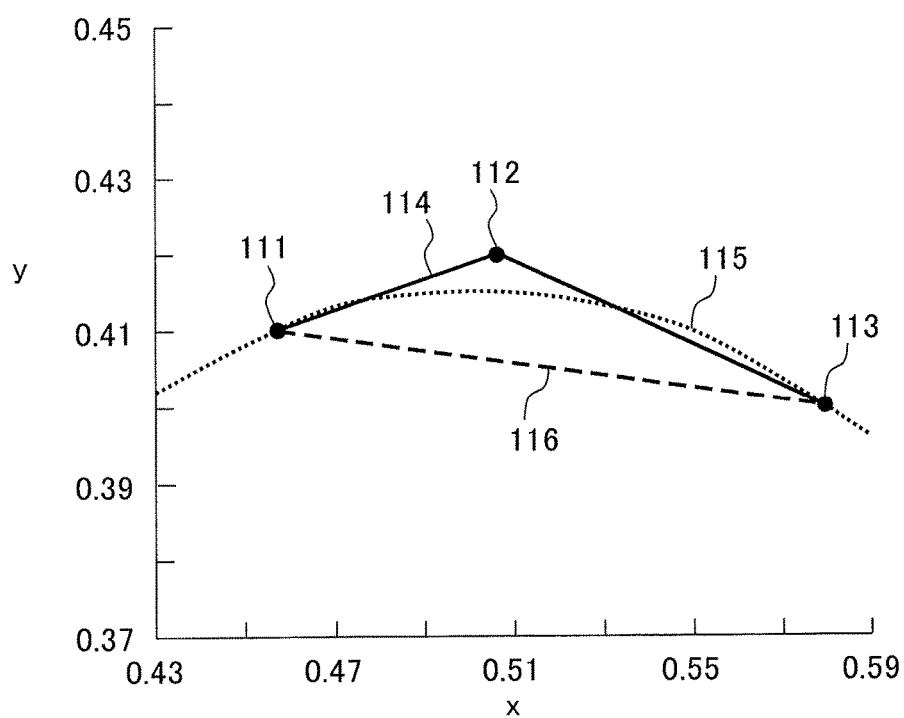
FIG. 11 is a diagram for explaining how the color of light emitted from the LED drive circuit 90 shown in FIG. 10 changes.

FIG. 11 is a diagram for explaining how the color of light emitted from the LED drive circuit 90 changes, where the abscissa and the ordinate respectively represent the chromaticity coordinates x and y of a CIE color system.

Referring to FIG. 11, a description will be given below of how the color of the light emitted from the LED drive circuit 90 changes. In FIG. 11, a point 111 indicates the chromaticity coordinates for 2700 K representing the emission color of the first LED string 91, a point 112 indicates the chromaticity coordinates of the emission color of the second LED string 92, and a point 113 indicates the chromaticity coordinates for 1600 K representing the emission color of the fourth LED string 93. A curve 115 shown as a dotted line represents the black body locus.

The color of the light emitted from the LED drive circuit 90 changes along a broken line 114 shown as a solid line. When the output current Io (see FIG. 10) of the variable constant current source 15 (see FIG. 9) is increased (the light output is increased from low to high), the color of the light emitted from the LED drive circuit 90 changes from the point 113 toward the point 112 (from the current range Ia3 to the current range Ic3 through the current range Ib3 in FIG. 10). When the output current Io of the variable constant current source 15 (see FIG. 9) is further increased, the color of the emitted light changes from the point 112 toward the point 111 (from the current range Ic3 to the current range Ie3 through the current range Id3 in FIG. 10).

In FIG. 11, the dashed line 116 indicates the change of the color of the light emitted from the LED drive circuit 10 (see FIG. 1). In the two-color LED drive circuit 10 having only the first and second LED strings 11 and 12, when the first LED string 11 emits light at 2700 K, and the second LED string 12 emits light at 1600 K, the color of the emitted light changes as indicated by the dashed line 116. As a result, when an object is illuminated with light whose color is deviated from the black body locus, the LED drive circuit 10 is unable to render the color of the object (object color) faithfully.

By contrast, the LED drive circuit 60 can continue to maintain the color of the emitted light close to the back body locus, which is not possible with the LED drive circuit 10. The LED drive circuit 60, unlike the two-color drive circuit, can render the object color so that it will appear natural. In FIG. 11, the point 112 is located at a position higher than the black body curve 115. The point 112 need only be located at a position near the region (the x value is approximately 0.48 to 0.54) where the black body curve 115 is substantially flat, and preferably, it is positioned near the peak (the x value is approximately 0.51) of the curve 115.

In the LED drive circuit 90, the period Ib3 (see FIG. 10) during which the second LED string 92 and the fourth LED string 93 are simultaneously driven to emit light and the period Id3 (see FIG. 10) during which the first LED string 91 and the second LED string 92 are simultaneously driven to emit light are set longer than the corresponding periods of the LED drive circuit 60. Accordingly, with the LED drive circuit 90, the color of the emitted light can be changed in much the same way as controlling the light output of an incandescent lamp with a dimmer.

While the LED drive circuit 90 has been described by assuming that the first LED string 91 emits light at 2700 K and the fourth LED string 93 emits light at 1600 K, the combination of the emission colors is not limited to this particular combination. For example, since colors of high color temperatures are preferred in Japan, the first LED string 91 may be configured to emit light at about 6500 K. Even when the emission color of the first LED string 91 is set to about 6500 K, it is preferable that the color of the emitted light as a whole is made to change so as to substantially follow the black body locus as the light output is changed. For example, in the CIE color system, the x component of the chromaticity coordinates describing the emission color of the second LED string 92 is set at a point intermediate between the chromaticity coordinates describing the emission color of the first LED string 91 and the chromaticity coordinates describing the emission color of the fourth LED string 93. Then, the y component of the chromaticity coordinates describing the emission color of the second LED string 92 is set so that the broken line connecting the chromaticity coordinates of the emission color of the first LED string 91, the chromaticity coordinates of the emission color of the second LED string 92, and the chromaticity coordinates describing the emission color of the fourth LED string 93 substantially follows the black body locus. When the x and y components of the chromaticity coordinates describing the emission color of the second LED string 92 are set as described above, the LED drive circuit 90 can be configured to produce light whose color changes so as to substantially follow the black body locus as the light output is changed, even when the emission color of the first LED string 91 is set to about 6500 K.

In the LED drive circuit 90, the emission color of the fourth LED string 93 has been set to 1600 K, and the color of the emitted light as a whole has been made to change in such a manner as to resemble the black body locus. However, if the fourth LED string 93 is configured to emit light of a color (for example, blue) noticeable in darkness while maintaining the circuit configuration of the LED drive circuit 90 unchanged, the light produced by driving only the fourth LED string 93 can be used as a night-light. In this case, the number of series-connected LEDs in the fourth LED string 93 must be reduced, and the emission color of the second LED string 92 must be set to about 1600 K.

Figure 12:
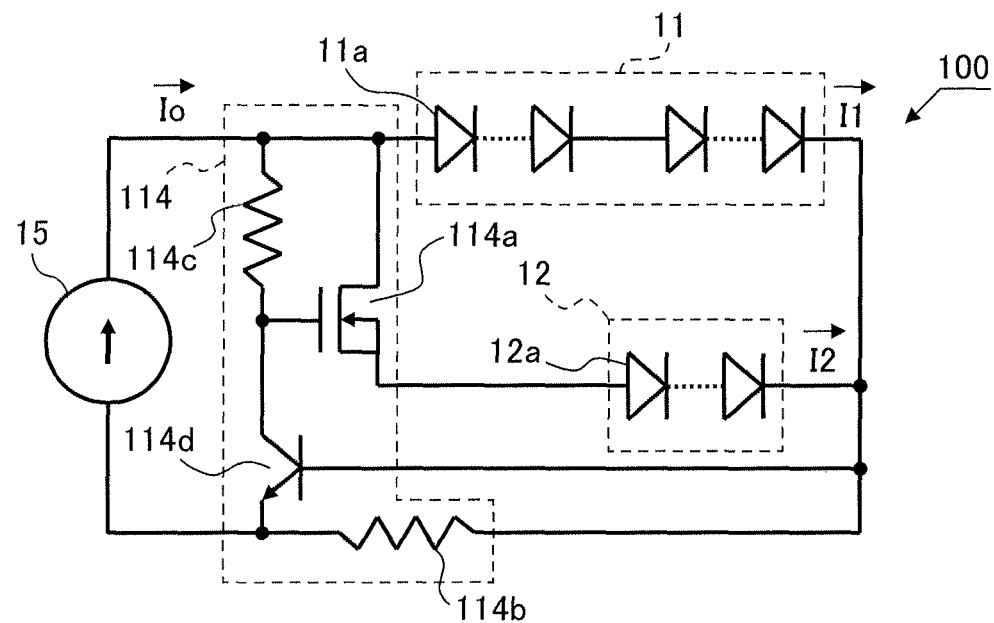
FIG. 12 is a circuit diagram of a yet further alternative LED drive circuit 100.

FIG. 12 is a circuit diagram of a yet further alternative LED drive circuit 100.

As shown in FIG. 12, the LED drive circuit 100 includes a variable constant current source 15, a first LED string 11, a second LED string 12, and a current limiting circuit 114. The first LED string 11, the second LED string 12, and the variable constant current source 15 are the same as the first LED string 11, the second LED string 12, and the variable constant current source 15 contained in the LED drive circuit 10 shown in FIG. 1.

The anode of the first LED string 11 is connected to the current output terminal of the variable constant current source 15, and the cathode is connected to the right terminal of a current sensing resistor 114b which is a current sensing element contained in the current limiting circuit 114. The anode of the second LED string 12 is connected to the source of an FET 114a contained in the current limiting circuit 114, and the cathode is connected to the right terminal of the current sensing resistor 114b.

The current limiting circuit 114 includes, in addition to the depletion-mode FET 114a as a switching element and the current sensing resistor 114b, a pull-up resistor 114c and a bipolar transistor 114d. The drain of the FET 114a and the upper terminal of the pull-up resistor 114c are connected to the anode of the first LED string 11. The gate of the FET 114a and the lower terminal of the pull-up resistor 114c are connected to the collector of the transistor 114d. The base of the transistor 114d is connected to the right terminal of the current sensing resistor 114b. The emitter of the transistor 114d and the left terminal of the current sensing resistor 114b are connected to the current return terminal of the variable constant current source 15.

The major differences between the LED drive circuit 100 and the LED drive circuit 10 are that, in the LED drive circuit 100, the FET 114a used as the switching element is disposed on the anode side of the second LED string 12 and that an amplifying circuit constructed from a combination of the pull-up resistor 114c and the transistor 114d is inserted. With the provision of the amplifying circuit, if the voltage across the current sensing resistor 114b only slightly exceeds 0.6 V (the base-emitter forward voltage drop of the silicon transistor), the gate voltage of the FET 114a drops, and the FET 114a cuts off. Accordingly, the LED drive circuit 100 exhibits behavior such that when the output current Io of the variable constant current source 15 is increased gradually, and the current Io reaches a specific value, the second LED string turns off and the first LED string turns on.

The LED drive circuit 100 can be regarded as a modification of the LED drive circuit 70 shown in FIG. 7. For example, if, in the LED drive circuit 70, the second LED string 12 is disposed between the FET 71 and the current sensing resistor 73, the LED drive circuit 70 becomes identical in configuration to the LED drive circuit 100. More specifically, in the LED drive circuit 70, the anode of the second LED string 12 is connected to the source of the FET 71, the cathode of the second LED string 12 is connected to the upper terminal of the current sensing resistor 73, and the drain of the FET 71 and the upper terminal of the resistor 74 are connected to the first LED string 11; then, the configuration is the same as that of the LED drive circuit 100.

Figure 13:
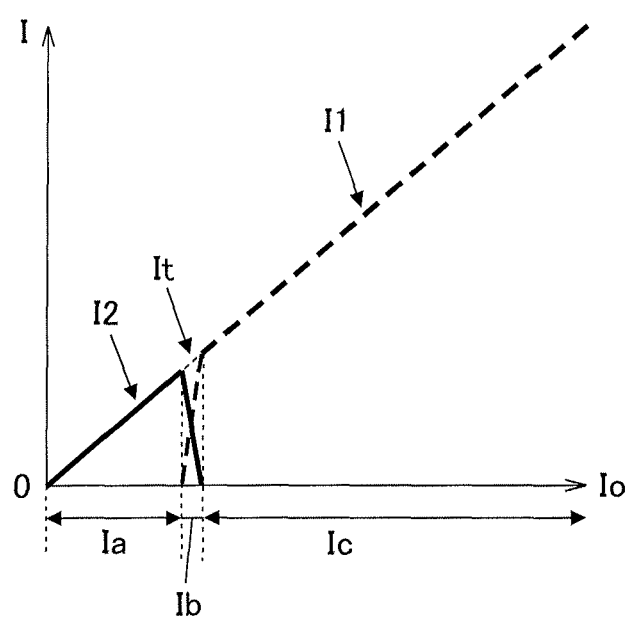
FIG. 13 is a diagram for explaining the operation of the LED drive circuit 100 shown in FIG. 12.

FIG. 13 is a diagram for explaining the operation of the LED drive circuit 100, where the abscissa represents the output current Io of the variable constant current source 15 and the ordinate represents the current I flowing through the various parts.

The operation of the LED drive circuit 100 will be described below with reference to FIG. 13. The current It flowing through the entire LED drive circuit 100 is the sum of the current I1 flowing through the first LED string 11 and the current I2 flowing through the second LED string 12. The current It is equal to the output current Io of the variable constant current source 15, and is represented by a straight line having a slope of 45° in FIG. 13.

In FIG. 13, when the output current Io of the variable constant current source 15 is small, that is, when the brightness level is decreased, only the current I2 to the second LED string 12 flows (It=I2, I1=0, the current range indicated by Ia). In this case, the voltage at the current output terminal of the variable constant current source 15 (relative to the voltage at the current return terminal which is assumed to be 0 V; the same applies hereinafter) is larger than the threshold voltage of the second LED string 12 but smaller than the threshold voltage of the first LED string 11.

The threshold voltage of the LED string here is given as the sum of the forward voltage drops of the series-connected LEDs contained in the LED string; for example, if the LED series circuit is constructed from a total of 10 LEDs each having a forward voltage drop of 3.2 V, the threshold voltage is given as 3.2 (V)×10=32 (V). In the LED drive circuit 100, if the variation range of the voltage that can stably drive the output terminal of the variable constant current source 15 at a constant current is small, the difference between the number of series-connected LEDs in the first LED string 11 and the number of series-connected LEDs in the second LED string 12 should be held to about two or three to reduce the difference between their threshold voltages.

The current limiting circuit 114 sets an upper limit value on the current I2 (as indicated at the right end of the current region Ia). When the current I2 is at its upper limit, the voltage developed across the current sensing resistor 114b is 0.6 V. When the current I2 is further increased from this condition, the collector-emitter part of the transistor 114d turns on. As a result, the FET 114a cuts off, the current I2 is reduced to 0 (A), and the current I1 flows through the first LED string 11. Since this change occurs abruptly, the rate of change of each of the currents I1 and I2 in the current range Ib in FIG. 13 is larger (steeper) than the rate of change of each of the currents I1 and I2 in the current range Ib in FIG. 2.

When the output current Io of the variable constant current source 15 further increases beyond the upper limit value (into the current range Ic), the current flowing as the current It is only the current I1 flowing through the first LED string 11 (It=I1).

In the LED drive circuit 100, the color temperature of the emission color (the first color) of the first LED string 11 and the color temperature of the emission color (the second color) of the second LED string 12 can be set, for example, to 2700 K and 1600 K, respectively. In this case, when set in the high brightness range (the current range Ic), the LED drive circuit 100 operates to produce light with high color temperatures, and when set in the low brightness range (the current range Ia), the LED drive circuit 100 operates to produce light with color temperatures with increased redness, and the intermediate brightness range (the current range Ib) can be virtually eliminated.

The LED drive circuit 100 has been described as using the depletion-mode FET 114a as the switching element. However, in the case of the FET 114a used in the LED drive circuit 100, unlike the FET 14a in the LED drive circuit 10, the threshold characteristics unique to the depletion-mode FET are not used to set the upper limit value of the current. In the LED drive circuit 100, the upper limit value of the current is determined by the current limiting resistor 114b and the base-emitter forward voltage drop of the transistor 114d. Therefore, the FET 114a in the LED drive circuit 100 may be replaced by an enhancement-mode FET or a bipolar transistor. Further, the transistor 114d in the LED drive circuit 100 may be replaced by a combination of a reference voltage source and a comparator.

Figure 14:
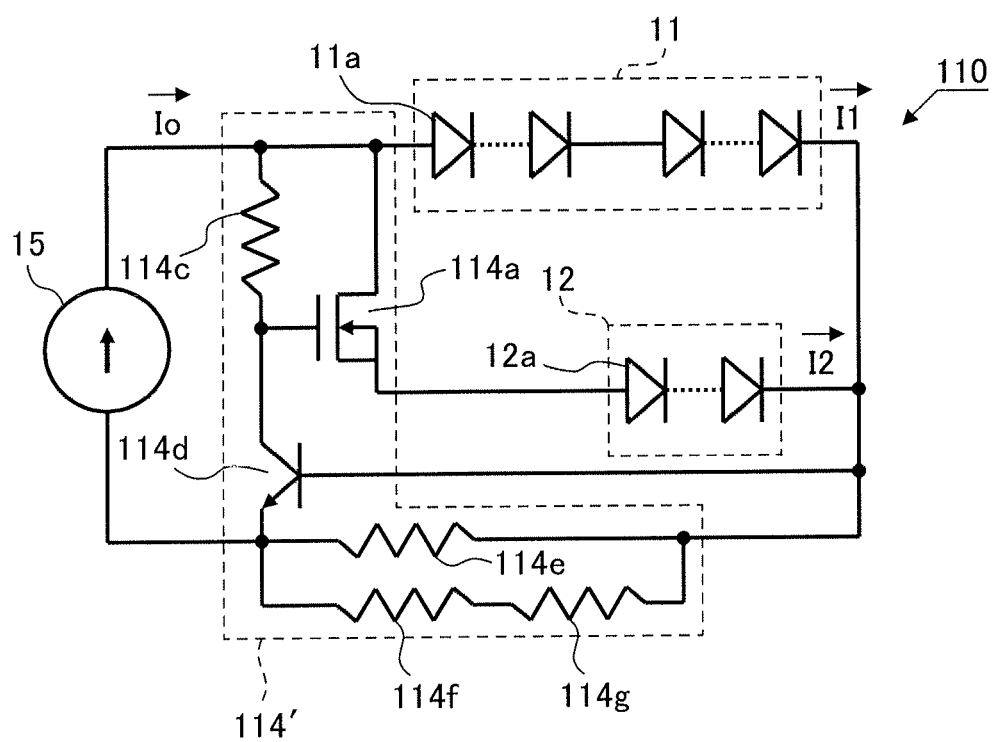
FIG. 14 is a circuit diagram of an even further alternative LED drive circuit 110.

FIG. 14 is a circuit diagram of an even further alternative LED drive circuit 110.

The LED drive circuit 110 shown in FIG. 14 differs from the LED drive circuit 100 shown in FIG. 12 only in that the current limiting circuit 114 in the LED drive circuit 100 is replaced by a current limiting circuit 114' in the LED drive circuit 110. In the current limiting circuit 114', the current sensing resistor 114b in the current limiting circuit 114 shown in FIG. 12 is replaced by a resistor 114e, a thermistor 114f, and a resistor 114g.

In the LED drive circuit 100 shown in FIG. 12, the forward voltage drops of the LEDs 11a and 12a and the forward voltage drop of the transistor 114d change with temperature. Accordingly, in the LED drive circuit 100, since the current range Ib is narrow (see FIG. 13), there is the possibility that the LED string emitting light with high color temperatures (like the first LED string) may come to emit light with low color temperatures (like the second LED string) when the temperature changes.

To address this, in the LED drive circuit 110 shown in FIG. 14, a temperature compensating function is incorporated in the current sensing resistor by using the resistor 114e, thermistor 114f, and resistor 114g. Instead of incorporating the temperature compensating function in the current sensing resistor, the temperature compensating function may be incorporated in the variable constant current source 15. However, in the LED drive circuit 100 shown in FIG. 12, since the variable constant current source 15 is an independent circuit block separately provided from the other parts, it is easier to handle the circuit if the temperature compensating function is incorporated in the current sensing resistor, as in the LED drive circuit 110 shown in FIG. 14.

DESCRIPTION OF REFERENCE NUMERALS 10, 30, 50, 60, 70, 80, 90, 100, 110 . . . LED DRIVE CIRCUIT
11, 51, 91 . . . FIRST LED STRING
11A, 12A, 51A, 53A, 63A, 85A, 91A, 92A, 93A . . . LED
12, 92 . . . SECOND LED STRING
14, 34, 54, 64, 65, 70X, 94, 95, 114, 114' . . . CURRENT LIMITING CIRCUIT
14A, 94A, 95A . . . DEPLETION-MODE FET
14B, 34B, 54B, 64B, 65B, 73, 94B, 95B . . . CURRENT SENSING RESISTOR
34C, 94C, 95C . . . SOURCE RESISTOR
53 . . . THIRD LED STRING
63, 93 . . . FOURTH LED STRING
71 . . . ENHANCEMENT-MODE FET
72 . . . BIPOLAR TRANSISTOR
74 . . . PULL-UP RESISTOR
85 . . . FIFTH LED STRING
111, 112, 113 . . . CHROMATICITY COORDINATES
114F . . . THERMISTOR

The invention claimed is:

1. An LED drive circuit comprising:
a variable constant current source having a current output terminal pair;
a first LED string having a plurality of series-connected LEDs and configured to emit a first color of light;
a second LED string having a plurality of series-connected LEDs and configured to emit a second color of light which is different from the first color of light; and
a current limiting circuit containing a current sensing element which detects a current flowing through the first LED string and a current flowing through the second LED string, and a switching element, wherein
the first LED string and the second LED string are connected in parallel with each other to the variable constant current source,
a first threshold voltage of the first LED string is larger than a second threshold voltage of the second LED string so that the second LED string only emits the light and the first LED string does not emit light when a voltage between the current output terminal pair is smaller than the first threshold voltage, and
the current limiting circuit controls the switching element so that the current flowing through the second LED string is limited and the first LED string only emits the light and the second LED string does not emit light when the current detected by the switching element is larger than a threshold current.

2. The LED drive circuit according to claim 1, wherein the both of the first LED string and the second LED string emit the light together when the voltage between the current output terminal pair is equal to or larger than the first threshold voltage and the current detected by the switching element is equal to or smaller than the threshold current.

3. The LED drive circuit according to claim 1, further comprising a third LED string disposed between the variable constant current source and the first and second LED strings.

4. The LED drive circuit according to claim 3, wherein the emission color of the second LED string, plotted as chromaticity coordinates in a CIE color system, is located between the emission color of the first LED string plotted as chromaticity coordinates and the emission color of the third LED string plotted as chromaticity coordinates, and a broken line connecting the chromaticity coordinates of the respective emission colors substantially follows a black body locus.

5. The LED drive circuit according to claim 1, further comprising:
a third LED string which is connected in parallel with the first and second LED strings to the variable constant current source; and
an additional current limiting circuit containing a second current sensing element and a second switching element, and wherein
the additional current limiting circuit limits a current flowing through the third LED string, based on a current flowing into the second current sensing element.

6. The LED drive circuit according to claim 1, further comprising a third LED string, wherein
an anode of the third LED string is connected to one terminal of the current output terminal pair which a current is output, and a cathode of the third LED string is connected to another terminal of the current output terminal pair through which the current is fed back.

7. The LED drive circuit according to claim 1, further comprising an output resistor which is connected between the current sensing element and a current output terminal of the switching element.

8. The LED drive circuit according to claim 1, wherein the switching element is a depletion-mode FET.

9. The LED drive circuit according to claim 1, wherein the current limiting circuit contains a bipolar transistor, the current sensing element is connected between a base and emitter of the bipolar transistor, and the switching element is controlled by a voltage output from a collector of the bipolar transistor.

10. The LED drive circuit according to claim 9, wherein the switching element is an enhancement-mode FET.

11. The LED drive circuit according to claim 9, wherein the current sensing element includes a thermistor.

* * * * *

UNITED STATES PATENT AND TRADEMARK OFFICE
CERTIFICATE OF CORRECTION

PATENT NO. : 10,182,486 B2
APPLICATION NO. : 15/509278
DATED : January 15, 2019
INVENTOR(S) : Takashi Akiyama Page 1 of 1

It is certified that error appears in the above-identified patent and that said Letters Patent is hereby corrected as shown below:

In the Claims

In Column 16, Claim 1, beginning at Line 28, "when the current detected by the switching element is larger than the threshold current." should read -- when the current detected by the current sensing element is larger than a threshold current. --

In Column 16, Claim 2, beginning at Line 34, "threshold voltage and the current detected by the switching element is equal to or smaller than the threshold current." should read -- threshold voltage and the current detected by the current sensing element is equal to or smaller than the threshold current. --

Signed and Sealed this
Thirteenth Day of August, 2019

Andrei Iancu
*Director of the United States Patent and Trademark Office*